(12) United States Patent
Whang et al.

(10) Patent No.: US 8,767,302 B2
(45) Date of Patent: Jul. 1, 2014

(54) LAMINATED OPTICAL DISK

(71) Applicant: National Taiwan University of Science and Technology, Taipei (TW)

(72) Inventors: Jong-Woei Whang, Taipei (TW); Chieh-Jen Hsiao, Taipei (TW); Meng-Che Tsai, Taipei (TW); Chung-Wei Wang, Taipei (TW); Ya-Hui Chang, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 0 days.

(21) Appl. No.: 13/920,151

(22) Filed: Jun. 18, 2013

(65) Prior Publication Data

US 2014/0126063 A1 May 8, 2014

(30) Foreign Application Priority Data

Nov. 8, 2012 (TW) .............................. 101141498 A

(51) Int. Cl.
*G02B 27/00* (2006.01)
*G02B 17/00* (2006.01)
*F21S 11/00* (2006.01)
*G02B 19/00* (2006.01)

(52) U.S. Cl.
CPC ........... *F21S 11/002* (2013.01); *G02B 19/0028* (2013.01); *G02B 19/0042* (2013.01)
USPC ........... 359/592; 359/597; 359/619; 126/683; 126/699; 60/641.15

(58) Field of Classification Search
CPC ........... G02B 19/0028; G02B 19/0042; G02B 17/006; F21S 11/002
USPC ................. 359/592, 597, 618–619; 165/48.2; 126/683–684, 688–689, 698–699; 60/641.15
See application file for complete search history.

(56) References Cited

U.S. PATENT DOCUMENTS

| | | | | |
|---|---|---|---|---|
| 4,411,493 A * | 10/1983 | Miller | ........................... | 359/595 |
| 4,575,196 A * | 3/1986 | Clegg | ........................... | 359/709 |
| 6,620,995 B2 * | 9/2003 | Vasylyev et al. | .............. | 136/246 |
| 6,710,926 B2 * | 3/2004 | Beach et al. | .................... | 359/623 |
| 7,925,129 B2 * | 4/2011 | Ghosh et al. | .................... | 385/31 |
| 2012/0019942 A1 * | 1/2012 | Morgan | ........................ | 359/853 |

\* cited by examiner

*Primary Examiner* — Christopher Mahoney
(74) *Attorney, Agent, or Firm* — Bacon & Thomas, PLLC

(57) ABSTRACT

A laminated optical disk, applied for lighting system or solar energy system, includes a plurality of annular lenses, a base and a circular light guiding unit. The annular lenses are arranged in order from center to outside to form a disk-structure. Each annular lens has a light-input curved surface and a light-output curved surface respectively matching the different thickness of the base. The light-input curved surface is opposite to the center. The light-output curved surface is opposite to the light-input curved surface, and facing to the center. The light is incident on the light-input curved surface, refracted and tended to concentrate by the light-input curved surface. Besides, the light exiting from the annular lens is to be refracted to the direction of the center by the light-output curved surface. The base of the laminated optical disk can significantly improve the light leakage problem by different annular lenses.

9 Claims, 9 Drawing Sheets

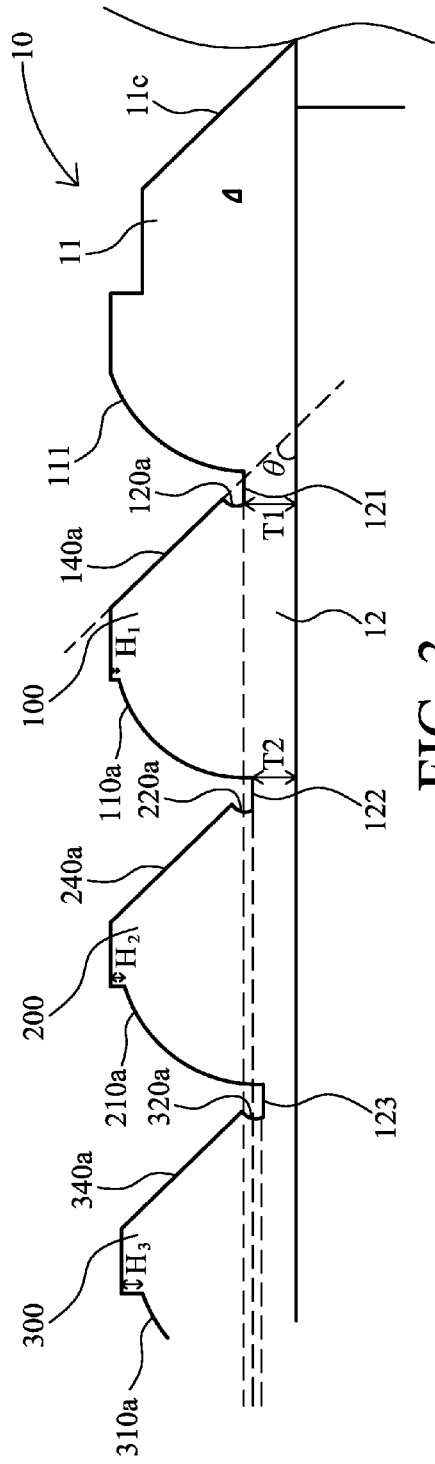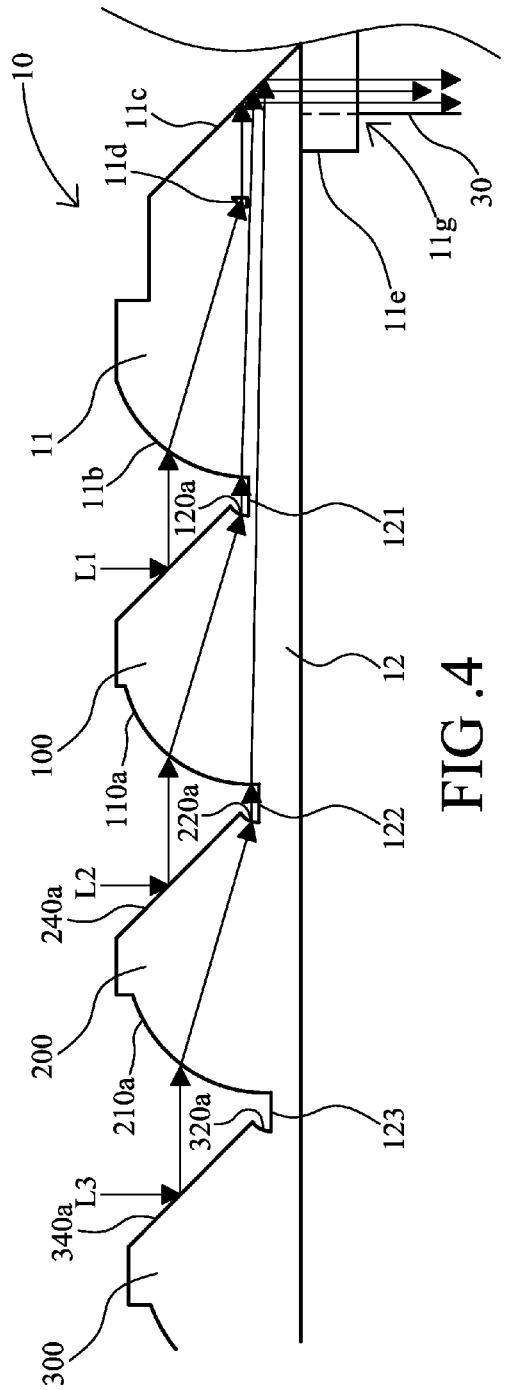
FIG.3
FIG.4

LAMINATED OPTICAL DISK

BACKGROUND OF THE INVENTION (1) Field of the Invention

The invention relates to an optical disk, and especially relates to an optical disk with laminated lenses.

(2) Description of the Prior Art

Due to rapid development of the industry, the gradual depletion of fossil fuels and greenhouse gas emissions have raised global concerns, how to consistently supply energy has become a major global issue. Solar energy is a kind of abundant, safe, renewable energy without causing environmental pollution and consuming other resources in generation processes, and the generation processes of solar energy would not cause global warming problem. Due to resource has been gradually consumed on the earth, energy becomes an excellent resource for power supply. How to utilize solar energy in the construction industry to provide natural illumination in a healthy way, and to effectively conserve energy for sustainable development, that is a main objective for pursuing nowadays.

In the construction industry, there are basically two methods to provide energy-efficient lighting: the first method is to utilize solar energy conversion technology, which generates electricity by conversing photos to electrons, but its conversion efficiency and capital cost are big problems; another method is to uses a light collector comprising appropriate optical design and light guiding system to guide the sunlight to increase the brightness indoor, and thus to achieve the purpose of reducing lighting power consumption.

However, the light energy would be loss in the process of light collecting, light transmitting and light emission in the natural light guiding system, therefore, how to increase the concentrating ratio of the light in the light collector, and to improve the light-compression ratio are the major problems to be solved.

SUMMARY OF THE INVENTION

Accordingly, one of the object of the invention is to provide a laminated optical disk for increasing the concentration ratio and the compression ratio to utilize the ambient light effectively.

In one aspect, the invention provides a laminated optical disk, including a first annular lens, a second annular lens, a base and a circular light guiding unit. The first annular lens has a center, a first light-input curved surface and a first light-output curved surface. The first light-output curved surface faces to the center, and is disposed opposite to the first light-output curved surface. The second annular lens is surrounding outside of the first annular lens, and the first annular lens and the second annular lens are arranged in a concentric circle manner. The second annular lens has a second light-input curved surface and a second light-output curved surface, the second light-output curved surface face to the first light-input curved surface. The second light-input curved surface is disposed opposite to the second light-output curved surface. The base is connected to the underside of the first annular lens and the second annular lens, and providing a first horizontal plane, a second horizontal plane located below the first horizontal plane, and a third horizontal plane located below the second horizontal plane. The first horizontal plane is connected to the first light-output curved surface; the second horizontal plane is connected between the first light-input curved surface and the second light-output curved surface; and, the third horizontal plane is connected to the second light-input curved surface. The circular light guiding unit is disposed at the center of the first annular lens, and having an inverted conical hollow portion and an outer curved surface. The outer curved surface is connected to the first horizontal plane; the inverted conical hollow portion has an inner sidewall opposite to the outer curved surface.

In an embodiment, the circular light guiding unit has a slot, the slot is located below the inverted conical hollow portion, and has a downward opening.

In another embodiment, the circular light guiding unit has a second inverted conical hollow portion, the second inverted conical hollow portion is disposed under the inverted conical hollow portion, and located directly above the slot.

In another embodiment, each of the annular lenses has an inclined reflective surface for reflecting the light in the surroundings to make the light toward the center.

In another embodiment, the base has a bottom plane, and the inclined reflective surface of each the annular lens and the bottom plane of the base have an included angle of 45 degrees.

In another embodiment, the first light-output curved surface of the first annular lens and the second light-output curved surface of the second annular lens are concave free-form curved surfaces.

In another embodiment, the concave free-form curved surfaces are spherical curved surfaces.

In another embodiment, the outer curved surface of the circular light guiding unit, the first light-input curved surface of the first annular lens, and the second light-input curved surface of the second annular lens are convex free-form curved surfaces.

In another embodiment, the convex free-form curved surfaces are spherical curved surfaces.

BRIEF DESCRIPTION OF THE DRAWINGS

FIG. 3 is the cross-section diagram of the extension line C-B in FIG. 1.

FIG. 4 is the cross-section diagram of the extension line C-A in FIG. 1.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
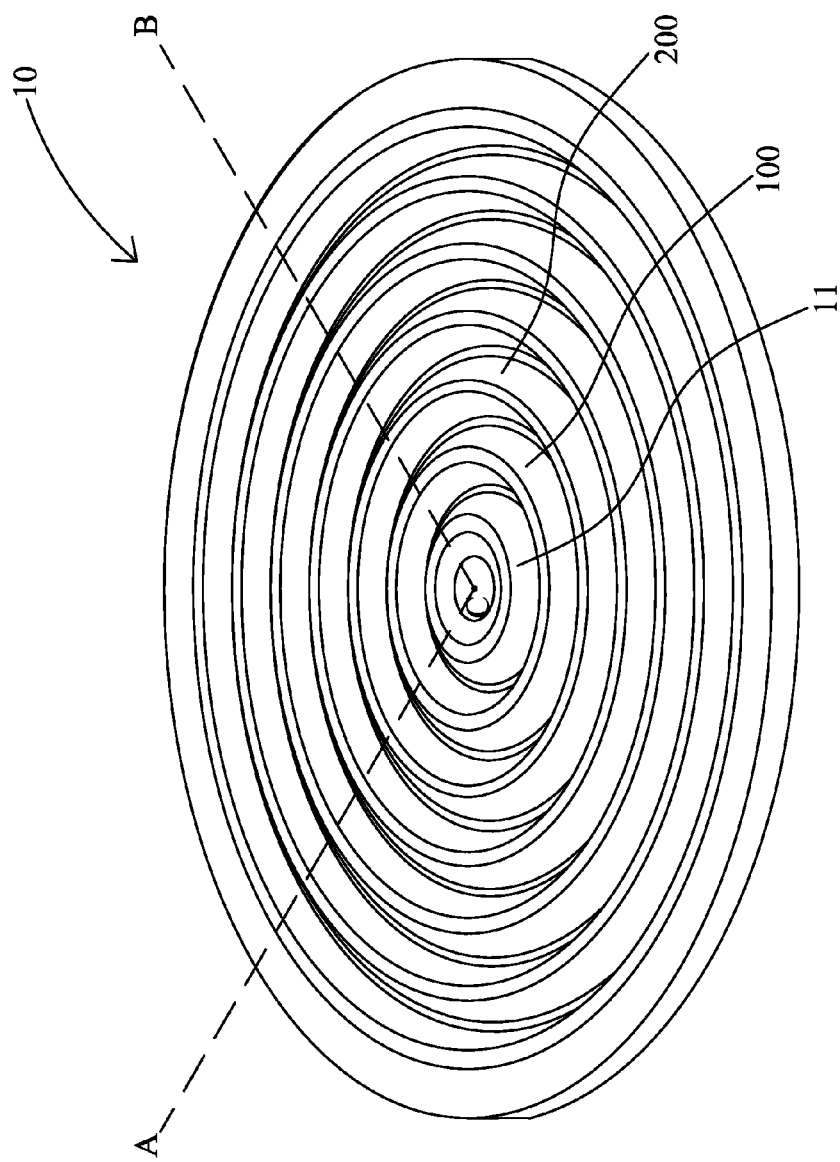
FIG. 1 is the stereogram in the first embodiment of the laminated optical disk.

Refer to FIG. 1, it is the stereogram of the laminated optical disk. The laminated optical disk 10 includes a light guiding unit 11 located at the center C, and a plurality of annular lens 100,200 are used to converge the ambient light and form a point light source. Both of the radius of annular lenses 100, 200 are different, and each of the annular lenses 100, 200 is based on the same center C, and arranged in a concentric circle manner. According to the radius of the annular lenses, the annular lenses are sequentially arranged from inside to outside, and from small to large, so as to form the laminated optical disk 10.

Figure 2:
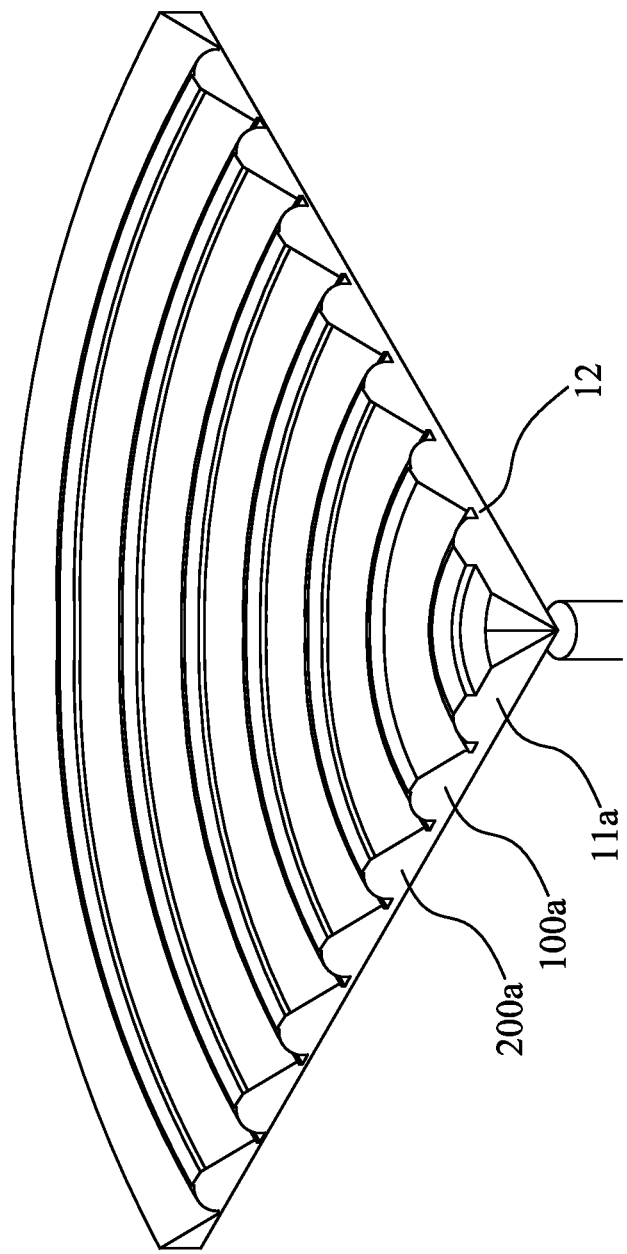
FIG. 2 is the cross-section diagram of extension line C-A and C-B in FIG. 1.

Refer to FIG. 2, it is the cross-section diagram of extension line C-A and C-B in FIG. 1. In the first embodiment, the laminated optical disk 10 includes a cross-section of circular light guiding unit 11a, a first cross-section of the annular lens 100a, a second cross-section of the annular lens 200a and a cross-section of the base 12.

Refer to FIG. 3, it is the cross-section diagram of extension C-B in FIG. 1. The circular light guiding unit 11 has an outer curved surface 11b. The first annular lens 100 surrounds outer side of the circular light guiding unit 11. The surface of the first annular lens 100 includes a first light-input curved surface 110a, a first light-output curved surface 120a, and a first reflective surface 140a. The first light-input curved surface 110a is located outside of the first annular lens 100, and faces away from the center C. The first light-output curved surface 120a faces away from the first light-input curved surface 110a, and located inner side of the first annular lens 100, and facing the center C. In the present embodiment, the first light-input curved surface 110a is a convex surface, and the first light-output curved surface 120a is a concave surface. The first reflective surface 140a is connected to one end of the first light-input curved surface 110a and the top of the first annular lens 100. The first light-input curved surface 110a and the first light-output curved surface 120a are spherical curved surfaces.

The radius of the second annular lens 200 is greater than the radius of the first annular lens 100, and the second annular lens 200 surrounds peripheral of the first annular lens 100. The surface of the second annular lens 200 includes a second light-input curved surface 210a, a second light-output curved surface 220a and a second reflective surface 240a. The second light-input curved surface 210a is located outside of the second annular lens 200, and facing away from the center C. The second light-output curved surface 220a faces away from the second light-input curved surface 210a, and located inside of the second annular lens 200, and facing the center C. In the present embodiment, the second light-input curved surface 210a is a convex surface, and the second light-output curved surface 220a is a concave surface. The second reflective surface 240a is connected to an end of the second light-input curved surface 210a and the top of the second annular lens 200. The second light-input curved surface 210a and the second light-output curved surface 220a are spherical curved surfaces. And so forth, the shape of the third annular lens 300 is similar to the second annular lens 200, the radius of the third annular lens 300 is greater than the radius of the second annular lens 200, and the third annular lens 300 surrounds periphery of the second annular lens 200. The surface of the third annular lens 300 includes a third light-input curved surface 310a, a third light-output curved surface 320a, and a third reflective surface 340a.

In the present embodiment, the reflective surfaces 140a, 240a and 340a are inclined surfaces, the included angle θ between the reflective surface 140a, 240a, 340a and the bottom plane 12b of the base 12 is 45 degrees, which is suitable for reflecting the light in the environment, to make the light travel toward the center C.

The base 12 is connected to the undersides of the first annular lens 100, the second annular lens 200 and the third annular lens 300. Worth mentioning is that, each thickness of the bottom planes matching the base 12 below the first light-output curved surface 120a, the second light-output curved surface 220a and the third light-output curved surface 320a are different. Such as FIG. 3 shown, the base 12 provides a first horizontal plane 121, a second horizontal plane 122 located below the first level 121, and a third horizontal plane 123 located below the second horizontal plane 122. The first horizontal plane 121 is connected to the first light-output curved surface 120a, the second horizontal plane 122 is connected between the first light-input curved surface 110a and the second light-output curved surface 220a, and the third horizontal plane 123 is connected between the second light-input curved surface 210a and light-output curved surface 320a.

In other words, for the same annular lens, the base thickness below the light-input curved surface is smaller than the base thickness below the light-output curved surface. For the first annular lens 100 concerned, the base thickness T2 below the first light-input curved surface 110a is smaller than the base thickness T1 below the first light-output curved surface 120a. And so on, it is true for every other annular lens 200, 300, and thus the more near the center C of the first horizontal surface 121, the larger thickness of the corresponding base. Therefore, the position of the first horizontal plane 121 is located above the second horizontal plane 122 which is away from the center C.

Refer to FIG. 4, it is the cross-section diagram of the extension line C-A in FIG. 1. In the process of converging ambient light, the peripheral third reflective surface 340a of the third annular lens 300 reflects the light L3 from the top to the second light-input curved surface 210a. The light L3 incident to the second light-input curved surface 210a may be refracted by the second light-input curved surface 210a, and be forward to the second light-output curved surface 220a.

Besides, after refracting the light L3 out of the second annular lens 200 via the second light-output curved surface 220a, the light L3 travels into the first light-input curved surface 110a horizontally, and then travels to the axis on center C. At this time, the second reflective surface 240a also reflects the light L2 from the top of to the first light-input curved surface 110a. The light L2 incident to the first light-input curved surface 110a may be refracted by the first light-input curved surface 110a, and be forward to the light-output curved surface 120a. Then, the light L2 is refracted by the first light-output curved surface 120a, and travel horizontally into the axis of the center C.

In one embodiment, the outer curved surface 11b of the circular light guiding unit 11 of the center C is connected to the first horizontal plane 121, and the circular light guiding unit 11 has an inverted conical hollow portion 11b. The inverted conical hollow portion 11b has an inner sidewall; the inner sidewall is inside of the outer curved surface 11b and forming an inverted conical reflective surface. The first reflective surface 140a may reflect the light L1 to the outer curved surface 11b of the circular light collecting unit 11, then refracted through the outer curved surface 11b and be forward to the curved surface 11d. After the light L1 refracted through the light-output curved surface 11d, the light L1 travel into the inner side wall of the inverted conical hollow portion 11c horizontally; and then the inner sidewall of the inverted conical hollow portion 11c reflect the light downward to the optical fiber 30, as the lighting and other applications. In one embodiment, the circular light guiding unit 11 has a slot 11e located under the inverted conical hollow portion 11c. The slot 11e has a downward opening portion 11g, for the optical fiber 30 docking therein.

The base 12 has the function of transmitting light. Because the first horizontal plane 121 of base 12 is located above the second horizontal plane 122, the light L3 may horizontally travel through above the second horizontal plane 122 and travel into the optical curved surface 110a horizontally, then may be incident to the center C in the base 12, simultaneously, in the conduction period may not be exposed to the other conductive medium, thus reducing the opportunity to cause light energy loss due to multiple refraction. Similarly, when the light L2 is conducted to the outer curved surface 11b of the circular light guiding unit 11, the light L2 may be directly transmitted through the base 12 to center C.

In addition, if disposing a fourth annular lens surrounding the third annular lens 300 (not shown), the fourth annular lens may guide the light incident to the third light-input curved surface 310a by its fourth reflective surface (not shown), and refract to the third light-output curved surface 320a, then make the light refract out of the third annular lens 300, so the light may travel to the second light-input curved surface 210a horizontally, so that the laminated optical disk 10 can collect more light.

By the said arrangement design of the first annular lens 100, the second annular lens 200, the third annular the lens 300 and the structural design of the base 12, the ambient light can converge to center C in sequence from the outermost layer third annular lens 300, through the second annular lens 200 even in the innermost layer first annular lens 100, so as to achieve the purpose of converging the ambient light to a point light source by the laminated optical disk 10, in order to enhance its compression ratio, to reduce the use of the number of the optical fiber, and to increase the light utilization efficiency.

Figure 5:
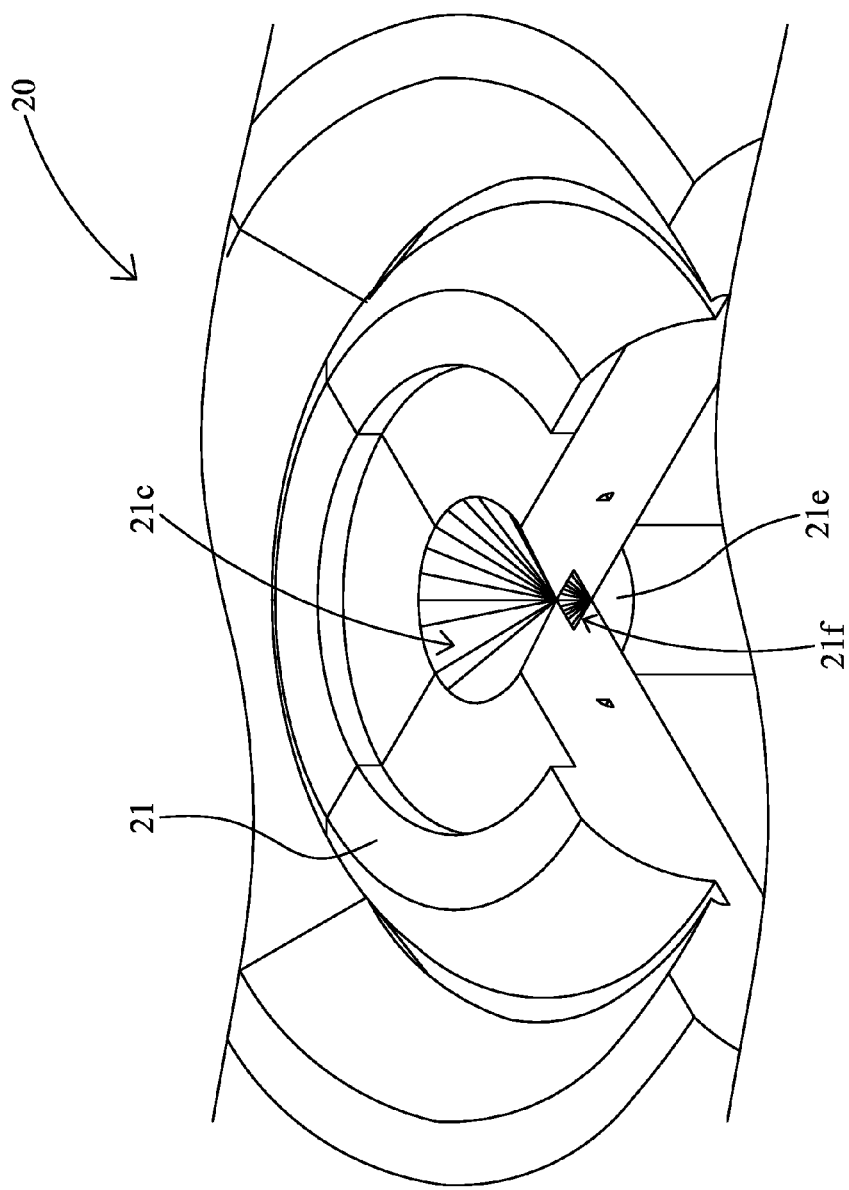
FIG. 5 and FIG. 6 are partial schematic diagrams in the second embodiment of the laminated optical disk.

Refer to FIG. 5, it is the schematic of the circular light guiding unit of the laminated optical disk. The difference of the laminated optical disk 20 in present embodiment and the laminated optical disk 10 in first embodiment is that the circular light guiding unit 21 has a slot 21e and two vertically stacked inverted conical hollow portion 21c and 21f. The slot 21e is located below the inverted conical hollow portion 21c and 21f. The inverted conical hollow portion 21f is set directly below the inverted conical hollow part 21c, and located directly above the slot 21e.

Figure 6:
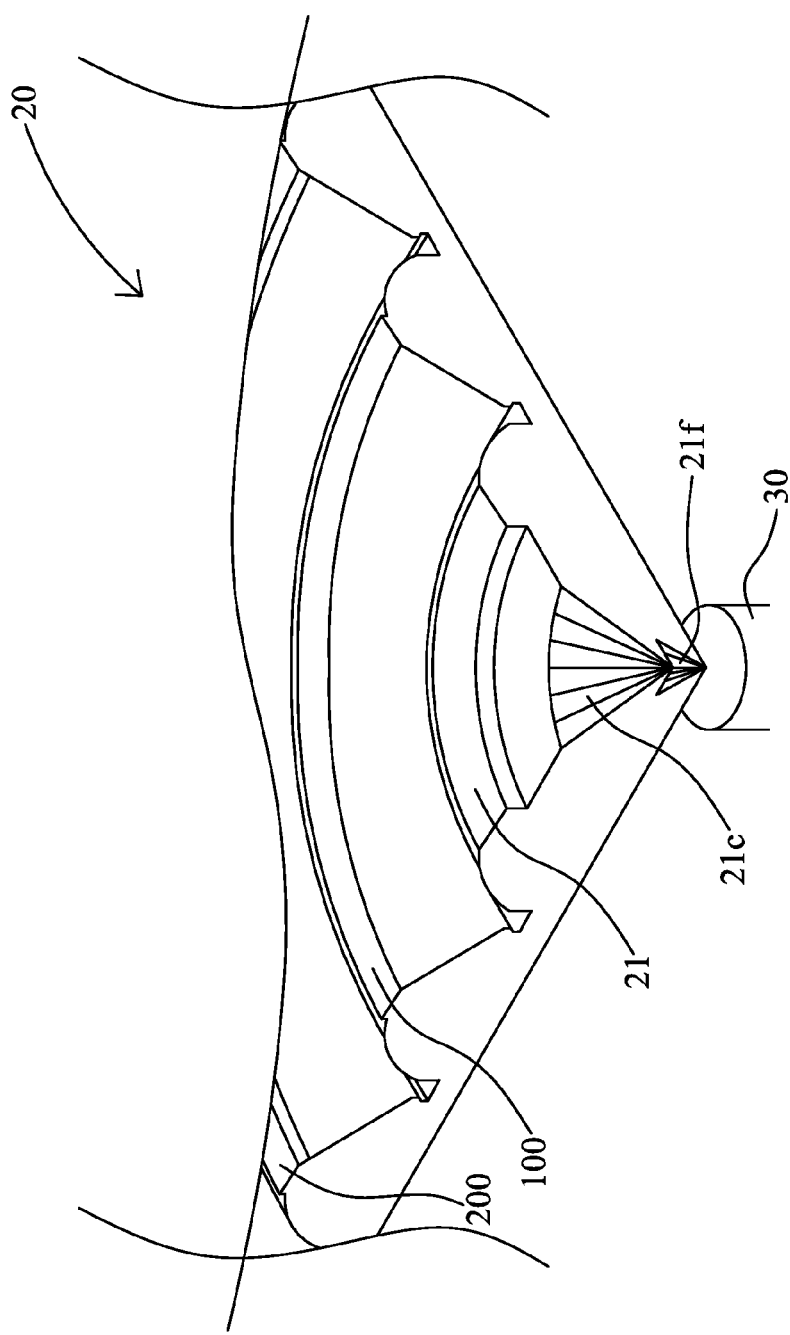
Figure 7:
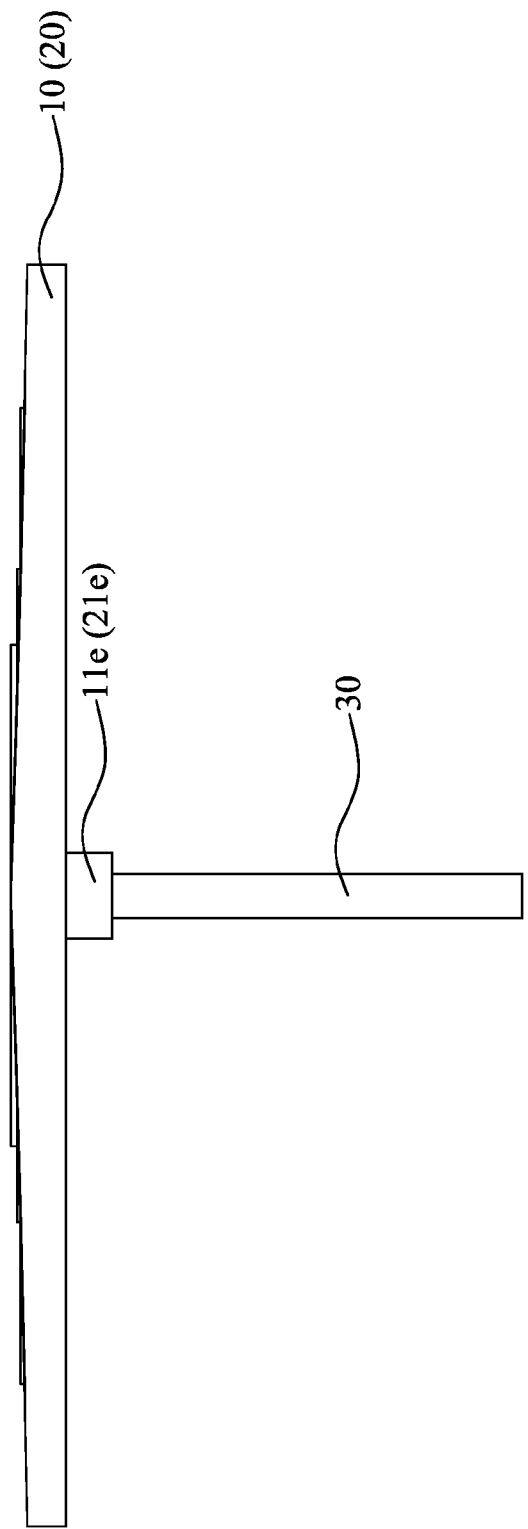
FIG. 7 is the side-view in one embodiment of the laminated optical disk.

FIG. 6 is a partial schematic diagram in the second embodiment of the laminated optical disk 20. FIG. 7 is a side view schematic of the combination of the laminated optical disk 10 (or 20) and the optical fiber 30. The detailed structure were described said above.

Figure 8:
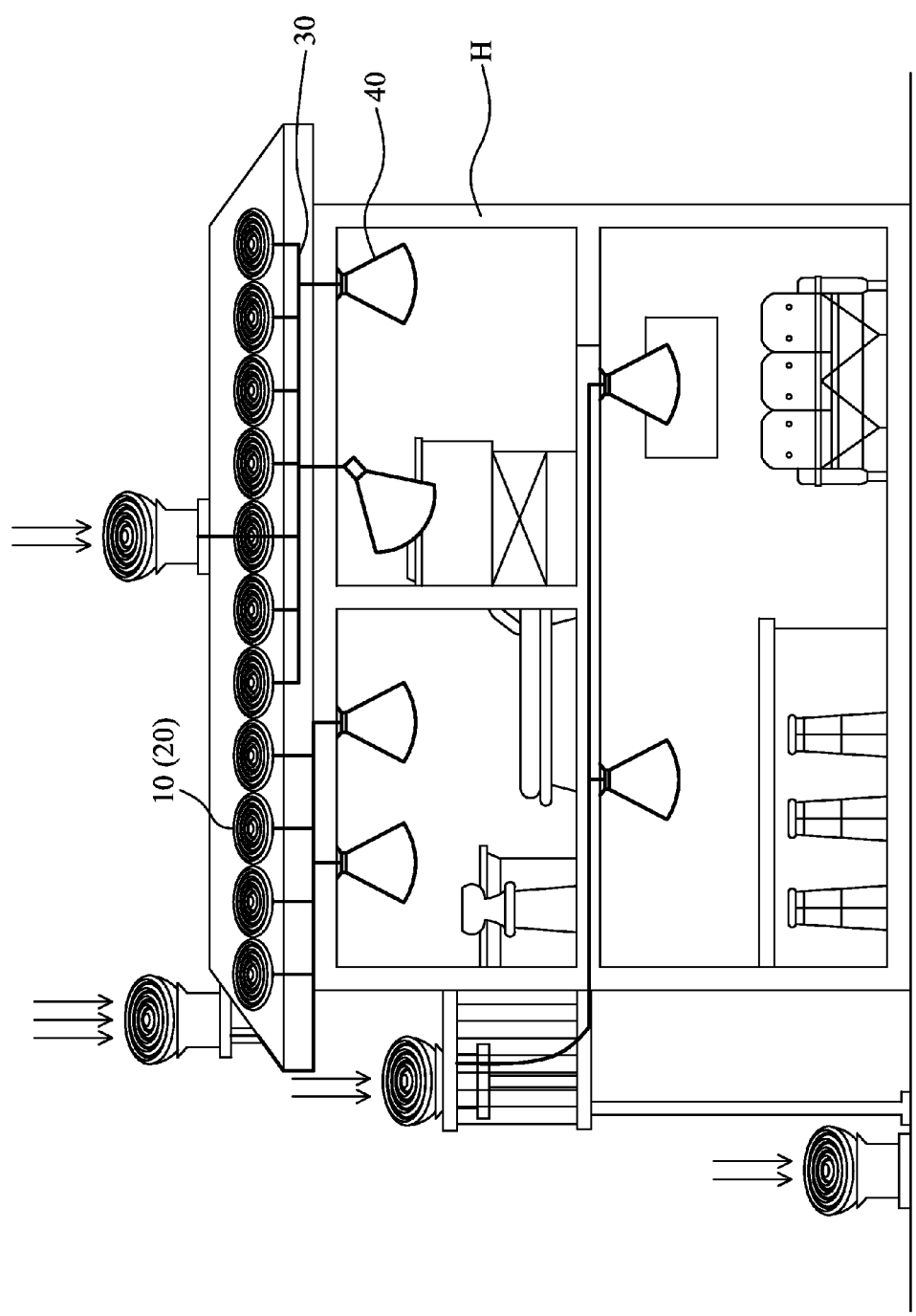
FIG. 8 is a schematic diagram of the invention applied on the building H.

As the shown in FIG. 8, it is a schematic diagram of the invention applied on the building H. The laminated optical disk 10 and 20 can collocate different use of the field to build materials type, such as laying on the roof, eaves, exterior walls of the building H and the surrounding open space. By the optical fiber 30 and light guiding pipe configuration, guiding the light to the room, and cooperated with the indoor lighting 40 as intelligent lighting choices, or applied to the solar tracking system, in order to strengthen the collection of solar cells required light energy.

Figure 9A:
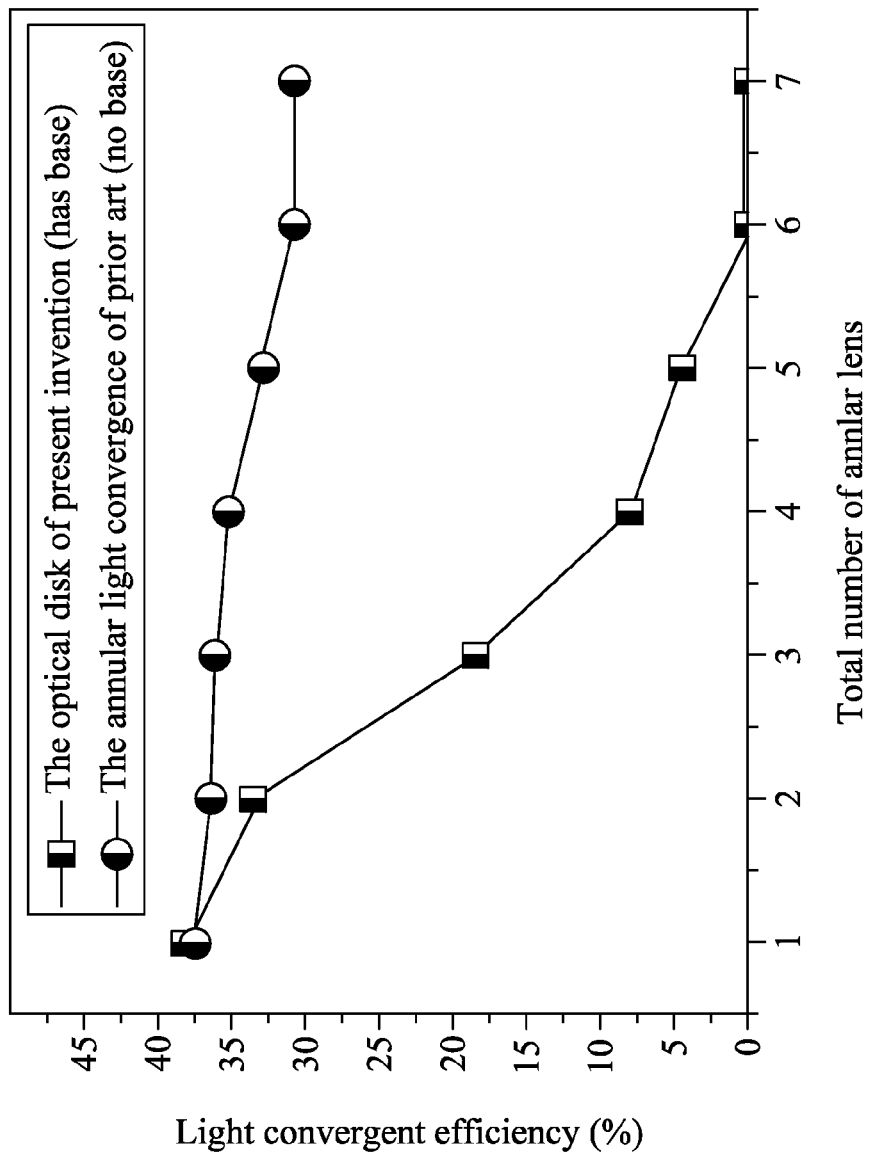
FIGS. 9A and 9B are the comparison of light collecting efficiency (%) of the laminated optical disk having the base in the present invention and the conventional laminated optical disk having no base.
Figure 9B:
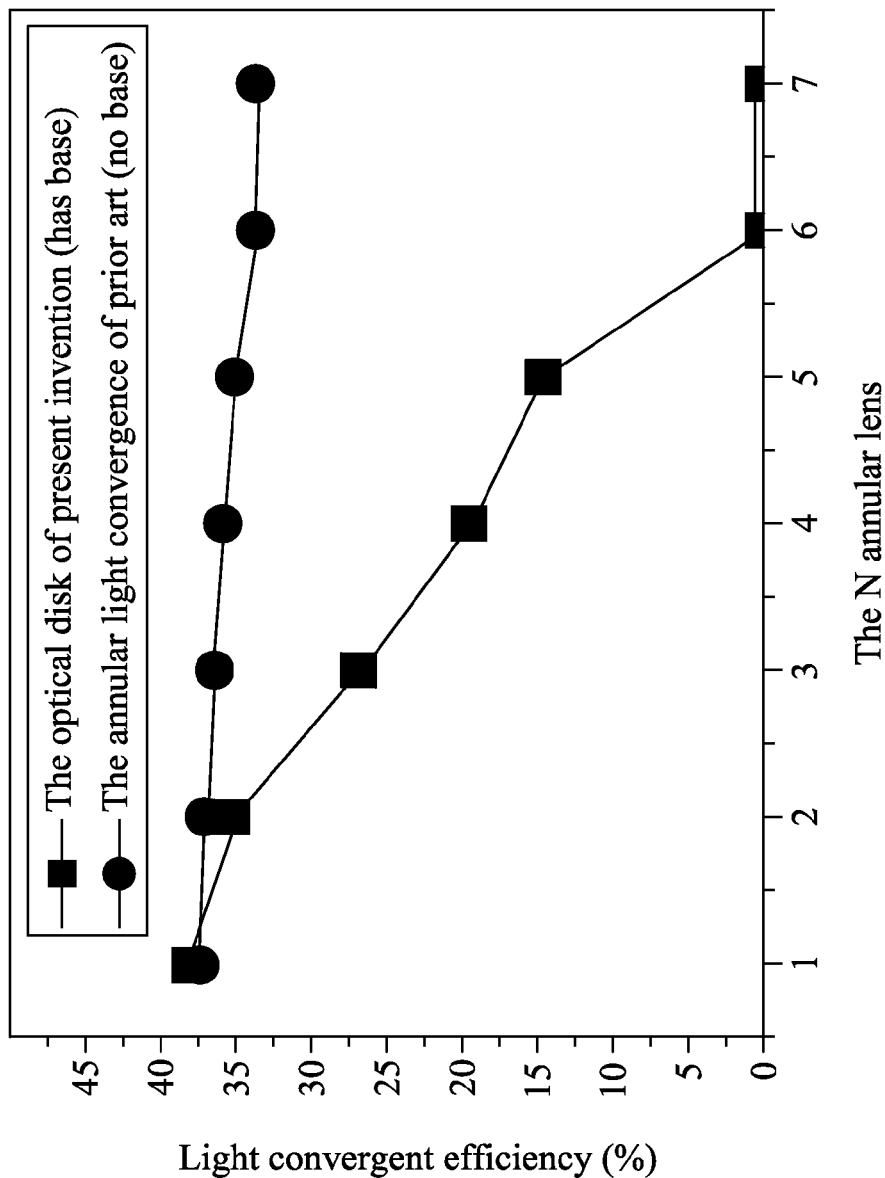

Refer to FIGS. 9A and 9B, they are the comparison of light collecting efficiency (%) of the laminated optical disk having the base in the present invention and the conventional laminated optical disk having no base. The larger number of the horizontal axis in FIG. 9A represents the more outer annular lens, it shows that the light collected by the outer annular lens travels into the inner annular lens, due to the differences of each thickness of matching base, the light based on the similar way of the light guide plate in the base for light transmission, thus reducing the times of light deflection in the different annular lens, therefore, it can significantly improve the light leakage problems between the different annular lens. Comparison to the to each annular lens, although the light collecting efficiency of the present invention is still gradually decline by the increasing rings of the annular lens and the distance of the conical hollow portion, but the recession phenomenon of the light collecting efficiency leveling off in the ring 6, and retaining excellent light gathering efficiency of 31% to the outer ring 7. In the design of the structure, each ring can effectively collect the light, the present invention provides more rings of the annular lens to enhance the collection area of the light due to the increasing disc area, therefore the FIG. 9B shows the overall average light collection efficiency remains excellent results. In contrast, the light gathering efficiency of the ring light collector which has no base in ring 7 or surrounding outside of the ring 7 closely dropped to zero.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A laminated optical disk comprising:
   a first annular lens, having a center, a first light-input curved surface and a first light-output curved surface, wherein the first light-output curved surface faces the center, and the first light-input curved surface is disposed opposite to the first light-output curved surface;
   a second annular lens, surrounding outside of the first annular lens, wherein the first annular lens and the second annular lens are arranged in a concentric manner, the second annular lens has a second light-input curved surface and a second light-output curved surface, the second light-output curved surface faces the first light-input curved surface, the second light-input curved surface is disposed opposite to the second light-output curved surface;
   a base, connected to the underside of the first annular lens and the second annular lens, and providing a first horizontal plane, a second horizontal plane located below the first horizontal plane, and a third horizontal plane located below the second horizontal plane, wherein the first horizontal plane is connected to the first light-output curved surface, the second horizontal plane is connected between the first light-input curved surface and the second light-output curved surface, and the third horizontal plane is connected to the second light-input curved surface; and
   a circular light guiding unit, disposed at the center of the first annular lens, wherein the circular light guiding unit has an inverted conical hollow portion and an outer curved surface, wherein the outer curved surface is connected to the first horizontal plane, the inverted conical hollow portion has an inner sidewall opposite to the outer curved surface.

2. The laminated optical disk of claim 1, wherein the circular light guiding unit has a slot, the slot is located below the inverted conical hollow portion, and has a downward opening.

3. The laminated optical disk of claim 2, wherein the circular light guiding unit has a second inverted conical hollow portion, the second inverted conical hollow portion is disposed under the inverted conical hollow portion, and located directly above the slot.

4. The laminated optical disk of claim 1, wherein each of the annular lenses has an inclined reflective surface for reflecting the ambient light toward the center.

5. The laminated optical disk of claim 4, wherein the base has a bottom plane, and the inclined reflective surface and the bottom plane have an included angle of 45 degrees.

6. The laminated optical disk of claim 4, wherein the first light-output curved surface of the first annular lens and the second light-output curved surface of the second annular lens are concave free-form curved surfaces.

7. The laminated optical disk of claim 6, wherein the concave free-form curved surfaces are spherical curved surfaces.

8. The laminated optical disk of claim 6, wherein the outer curved surface of the circular light guiding unit, the first light-input curved surface of the first annular lens, and the second light-input curved surface of the second annular lens are convex free-form curved surfaces.

9. The laminated optical disk of claim 8, wherein the convex free-form curved surfaces are spherical curved surfaces.

* * * * *